(12) United States Patent
Lesage

(10) Patent No.: US 11,788,770 B2
(45) Date of Patent: Oct. 17, 2023

(54) METHOD AND SYSTEM FOR SECURING TEMPERATURE SENSORS ON THE OUTER SURFACE OF A TANK OF AN ELECTRIC WATER HEATER

(71) Applicant: MICLAU-S.R.I. INC., Montreal East (CA)

(72) Inventor: Claude Lesage, Pointe Claire (CA)

( * ) Notice: Subject to any disclaimer, the term of this patent is extended or adjusted under 35 U.S.C. 154(b) by 172 days.

(21) Appl. No.: 17/370,066

(22) Filed: Jul. 8, 2021

(65) Prior Publication Data

US 2021/0333016 A1   Oct. 28, 2021

Related U.S. Application Data

(62) Division of application No. 16/501,261, filed on Mar. 14, 2019, now Pat. No. 11,149,986.

(51) Int. Cl.

| | |
|---|---|
| *F24H 1/20* | (2022.01) |
| *F24H 9/20* | (2022.01) |
| *G01K 1/143* | (2021.01) |
| *G05D 23/19* | (2006.01) |
| *F24H 15/14* | (2022.01) |
| *F24H 15/174* | (2022.01) |
| *F24H 15/37* | (2022.01) |
| *F24H 15/225* | (2022.01) |
| *F24H 15/443* | (2022.01) |
| *F24H 15/457* | (2022.01) |
| *F24H 15/414* | (2022.01) |

(52) U.S. Cl.
CPC ........... *F24H 9/2021* (2013.01); *F24H 1/202* (2013.01); *F24H 15/14* (2022.01); *F24H 15/174* (2022.01); *F24H 15/225* (2022.01); *F24H 15/37* (2022.01); *G01K 1/143* (2013.01); *G05D 23/1917* (2013.01); *F24H 15/414* (2022.01); *F24H 15/443* (2022.01); *F24H 15/457* (2022.01)

(58) Field of Classification Search
CPC ... G05D 23/1917; F24H 1/202; F24H 9/2021; F24D 2220/08; F24D 2220/04; F24D 2240/26; G01K 1/143
See application file for complete search history.

(56) References Cited

U.S. PATENT DOCUMENTS

2016/0273969 A1* 9/2016 Lesage .................. G01K 1/146

FOREIGN PATENT DOCUMENTS

JP   2008180407 A  *  8/2008

* cited by examiner

*Primary Examiner* — Steven S Anderson, II
(74) *Attorney, Agent, or Firm* — Guy J. Houle; HOULE PATENT AGENCY INC. GIANT FACTORIES INC.

(57) ABSTRACT

A temperature sensor securing system and method is described for securing two or more temperature sensors against an outer surface of a side wall of a tank of an electric water heater. The temperature sensors are secured spaced apart on an elongated support such as a circuit board which is held in position against the tank outer surface by support means. An expandable liquid foam causes the temperature sensors to be biased against the outer surface of the tank side wall to sense the temperature of the side wall at the location of the sensors and to generate actual temperature signals to a controller which is programmed to communicate with a subscriber and/or energy provider to control the water temperature inside the tank.

4 Claims, 4 Drawing Sheets

METHOD AND SYSTEM FOR SECURING TEMPERATURE SENSORS ON THE OUTER SURFACE OF A TANK OF AN ELECTRIC WATER HEATER

TECHNICAL FIELD

The present invention relates to a method and a system for securing temperature sensors spaced apart vertically along the outer surface of a tank of an electrical water heater to provided temperature signals to control means to monitor the temperature of water within the tank and provide adjustment of the water temperature.

BACKGROUND OF THE INVENTION

Reference is made to U.S. Pat. No. 10,101,216, issued to Applicant on Oct. 16, 2018 and which relates to a metal conduit positioned vertically against the tank wall of an electric water heater and in which is removably positioned al elongated narrow circuit board on which are mounted temperature sensors to sense the temperature exposed to the temperature sensors, herein thermistors. In one embodiment an elongated vertical through is formed against the tank wall to permit the temperature sensors to be positioned closely space to the tank wall while permitting the circuit board to be removed is any one of the temperature sensors or the entire circuit board require replacement.

In recent years, and due to the increase cost of electricity, more sophisticated control systems have been developed to control the operation of the water heater whereby to operate the resistive heating elements during non-peak hours when electricity costs are lowest to create a reserve of hot water for use during peak-hours to reduce the operating time of the elements when electricity is at a premium. Applicant has also disclosed in pending patent applications the need to control the temperature of the water at the bottom end of electric water heaters to a temperature sufficiently high to prevent the proliferation of bacteria and particularly the *Legionella* bacteria. It is known that this bacteria does not survive at temperatures in the range of 140 degrees Fahrenheit. Therefore, it is of importance to monitor the temperature in this area of the tank and to control the heating elements in the tank to assure that such temperature be maintained in this bottom area of the tank. There is also a need to monitor the temperature profile of the water within the tank of such water heater by the grid provider.

Utilities also have a need to take control of water heaters to prevent overcharging its grid during peak hours and to use its electricity when the demand is low as well as the cost. Such control would create an equilibrium or a mean demand of electricity from the grid. Still further, after power outages when electricity is restored, it is desirable for the utility to control the load to prevent an overload on the grid. Control devices have been developed and continue to be developed to remotely control the actuation of the resistive heating elements of the water heaters at the customer locations while attempting to satisfy the hot water demands of the customers. In order to achieve this, it is necessary to determine the temperature of the hot water reserve inside the tank of the water heater. Accordingly, temperature sensors are required to provide actual temperature values at distinct locations of the water tank and particularly in the uppermost region of the tank where the hottest water is located and drawn. As above mentioned it is also important to monitor the temperature at the bottom end of the tank where bacteria can develop and propagate in the sediment deposits in the cavitated area surrounding the dome-shaped bottom wall of the tank.

Thermistors are excellent electrical components for sensing temperature variations as its resistance varies with temperature changes. Because the water tank is constructed of steel material which is a good thermal conductor, by sensing the temperature of the steel by mounting thermistors there against, the temperature of the water inside the tank can be fairly accurately determined. To ensure a desired hot water volume in the tank, it is necessary to monitor the temperature of the water in the region of the heating elements. Because the thermistors need to be mounted outside the water tank wall, there is often no access to these sensor components once the thermal insulation foam is injected about the tank wall sealing access to these devices and their wiring. Water heaters are now being manufactured with three resistive heating elements to achieve better control of the water temperature in the tank and by selecting the operation of the various heating elements, some of which may be of a much lower wattage than the others. Thus, three thermistors would be required to monitor the temperature of the tank wall in the region of the three resistive heating elements. Because of the insulation blown inside the gap formed between the outer skin of the water heater and the water tank, there would be a need to form foam dams about the thermistors and access doors in the outer casing for access to the thermistors in case of a defect. This is not practical and adds to cost. Also, it complicates the troubleshooting and repair and does not remedy a defective wiring problems that could occur between the thermistors.

Mounting the thermistors on the tank wall and sealing them with the foam insulation would require replacing the hot water heater to remedy a defective thermistor problem or a defective associated wiring problem inside the water heater.

It would be desirable to use the foam insulation of the tank to bias the temperature sensors directly against the tank wall to achieve an improved temperature reading while surrounding the temperature sensors with thermal insulation. It would also be desirable to permit the use of the expanding insulation to apply pressure against the temperature sensors to assure good contact with the tank wall and also permitting the circuit board to be removable for its replacement should there be a defect in the wiring or the temperature sensors.

SUMMARY OF THE INVENTION

It is therefore a feature of the present invention to provide a temperature sensor securing system and method which makes use of the expansion of the thermal insulation disposed between the outer surface of the tank and the outer casing of the water heater to pressure bias the temperature sensors against the outer surface of the tank of an electric water heater.

Another feature of the present invention to position temperature sensors along a vertical orientation against the outer surface of a tank of an electrical water heater to provide temperature readings from the bottom end of the tank to a top end where hot water is drawn from the tank.

Another feature of the present invention is to provide monitoring of water temperature in the bottom end of the tank of an electric water heater whereby to control the temperature of water at the bottom end to prevent the development of bacterial and particularly the *Legionella* bacteria.

A still further feature of the present invention is to secure temperature sensors at predetermined positions on an inner surface of an expandable foam pouch disposed in the insulation space between the tank outer surface and an outer casing of the water heater to automatically secure the temperature sensors against the tank outer surface when the foam forming liquid within the pouch is expanded and to apply a pressure against the temperature sensors while surrounding the temperature sensors with insulation and thereby obtaining a more precise reading of the temperature of the wall of the tank at the location of the temperature sensor.

Another feature of the present invention is to use the expandable foam to apply pressure on a flexible conduit in which a circuit board on which is mounted temperature sensors to pressure bias the sensors against the tank outer surface while permitting frictional sliding removal of the circuit board.

According to the above features, from a broad aspect, the present invention provides a temperature sensor securing system for sensing water temperature inside a water heater tank at predetermined levels. The system comprises an elongated support member on which is secured at least two temperature sensors spaced-apart at predetermined positions along the support member. Biasing expandable foam retains the elongated support member against an outer surface of a side wall of the tank and along a longitudinal axis of the tank to position the at least two temperature sensors in contact with the outer surface of the side wall to sense the temperature of the outer surface of the side wall at the predetermined positions of the temperature sensors. The temperature sensors are secured to conductors for connection to a signal processor programmed to generate data representative of the temperature sensed by the at least two temperature sensors and wherein the sensed temperature has a correlation to the actual temperature of water inside the tank in the area of the predetermined position of the temperature sensors.

According to another broad aspect of the present invention there is further provided a temperature sensor securing system for sensing water temperature inside a water tank of an electric water heater at predetermined levels. The temperature sensor securing system comprises an expandable foam pouch of flexible material dimensioned for insertion between an outer surface of the water tank and an outer casing of the water heater surrounding the outer surface of the water tank spaced a predetermined distance from the outer surface to form a surrounding insulation space. The expandable foam pouch has an inner flexible sheet on an outer surface of which is attached at least two temperature sensors at different spaced-apart locations wherein when a foam forming liquid is inserted into the expandable foam pouch, the pouch is causes to expand and deploy into the insulation space. The at least two temperature sensors become pressure biased against the outer surface of the tank at east two different spaced apart locations by the expandable foam pouch to sense the temperature of the outer surface of the tank representative of the water temperature in the tank at the at least two different spaced locations.

According to a still further broad aspect of the present invention there is provided a method for securing at least two temperature sensors against an outer surface of a tank of an electric water theater. The method comprises the following steps. (i) Providing an elongated circuit board on which is mounted the at least two sensors at predetermined spaced intervals to sense the temperature of the outer surface of the tank at the predetermined spaced intervals. The sensed temperature has a correlation to the actual temperature of water in the tank at the spaced intervals. (ii) Retaining the at least two sensors against the outer surface of the tank along a longitudinal axis of the tank, and (iii) pressure biasing the at least two sensors against the outer surface of the tank by means of an expandable foam acting the temperature sensors.

BRIEF DESCRIPTION OF THE DRAWINGS

A preferred embodiment of the present invention will now be described with reference to the accompanying drawings which are representative of examples of the preferred embodiments and wherein.

DETAILED DESCRIPTION OF THE DRAWINGS

Figure 1:
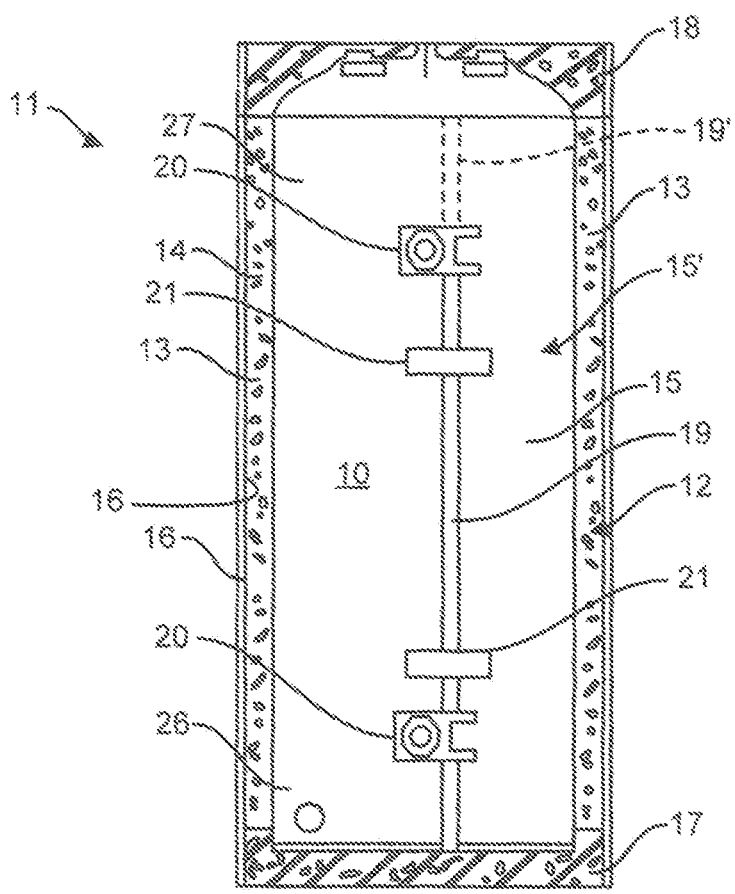
FIG. 1 is a simplified fragmented side view of an electric water heater illustrating the tank on which is secured the temperature sensors and wherein the tank is surrounded by an expandable foam materials disposed between the tank outer surface and the outer casing of the tank.

Referring now to the drawings, and more particularly to FIGS. 1 to 4, there is shown a tank 10 of an electrical water heater 11 encased within a thermal insulating jacket 12 constituted by expandable foam material 13 deployed within an insulating space 14 defined between the outer surface 15 of the tank 10 and an outer surrounding casing 16 of the water heater. The tank 10 rests on a rigid insulating foam base 17 disposed at a bottom end of the tank and a further rigid insulating foam cap 18 is secured to the top end of the tank. Accordingly, the tank 10 is completely surrounded by thermal insulation.

An elongated channel member 19 is retained on the outer surface 15 of the tank 10 before the installation of the outer casing 16 and is retained along a substantially long axis of the tank by clamps 20 or adhesive tapes 21. As shown, the clamps 20 have a leaf spring 20' shaped to engage the elongated channel member 19 and apply pressure there against to immovably retain the channel member 19 along a straight vertical axis on the outer surface 15 of the tank side wall 15'. The elongated channel member 19 as herein illustrated defines a generally U-shaped wall 25 with a longitudinal side opening which is held against the outer surface 15 of the tank side wall 15'. An elongated straight flat and narrow circuit board 22, on which at least two temperature sensors 23 are secured at predetermined spacing, is positioned within the elongated channel member 16 with the temperature sensors facing and in contact with the outer surface 15 of the tank side wall 15'.

Biasing means, in the form of an expandable foam material 24, is injected into the space between the circuit board 22 and the inner surface 19' of the channel member 19 from a top end of the channel member whereby to exert pressure on the back side of the circuit board and firmly bias the temperature sensors against the outer surface 15 of the tank side wall 15'. The temperature sensors generate temperature value signals representative of the temperature of the tank wall surface at the predetermined locations of the temperature sensors. The temperature value signals are representative of the water temperature inside the tank at the predetermined locations of the temperature sensors 23. The temperature of the tank side wall at the different locations corresponds substantially to the water temperature inside the tank adjacent the temperature sensors or is correlated thereto. It is pointed out that three or four or more temperature sensors 23 may be secured to the circuit board 22 and positioned against the outer surface of the tank side wall from a bottom end 26 of the tank to a top position 27 where hot water is drawn out of the tank 10.

Figure 2:
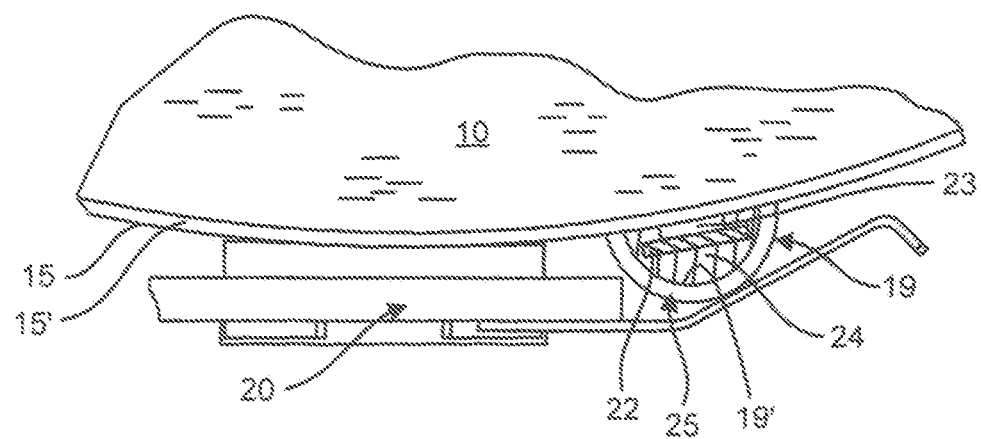
FIG. 2 is a fragmented cross-sectional view illustrating the securing system of the temperature sensors mounted inside an elongated channel and in which is injected an expandable foam the retain the temperature sensors against the tank outer side wall in a thermal insulating manner.
Figure 3:
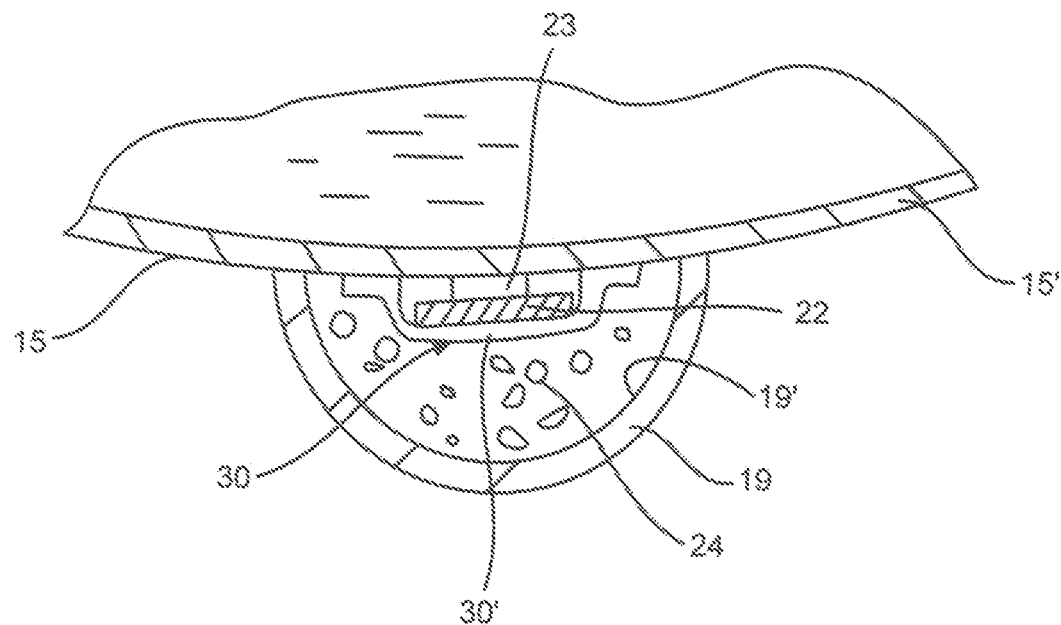
FIG. 3 is an enlarged cross-sectional view of a modified version of FIG. 2 and wherein the temperature sensors are mounted on a circuit board which is disposed in a flexible channel retained against the outer surface of the tank wall and wherein the expandable foam of the insulation pressure biases the temperature sensors against the outer surface of the tank wall with the circuit board being removable from the channel form a top end of the channel with the temperature sensors in frictional sliding movement on the outer surface of the tank wall.
Figure 4:
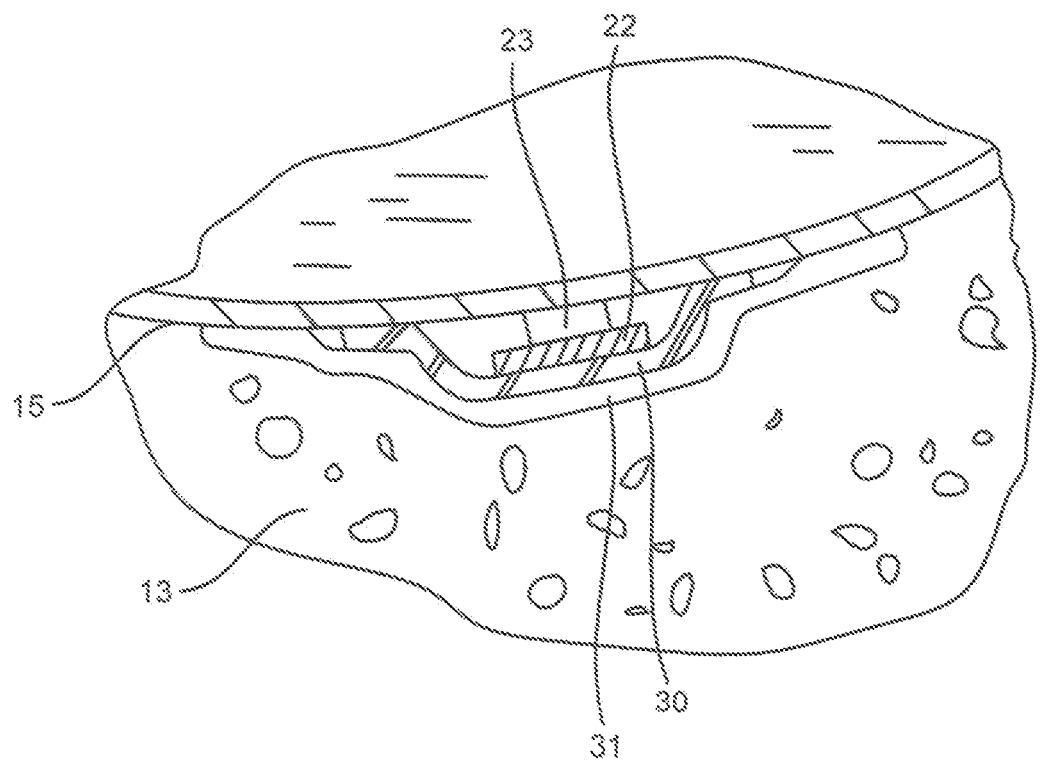
FIG. 4 is a cross-section view illustrating the flexible channel secured to the outer surface of the tank wall by an adhesive tape with the expandable foam acting directly on the flexible channel.

With reference to FIGS. 3 and 4, there is shown a modification of the FIG. 2 embodiment, and wherein a thin and shallow U-shaped non-metallic barrier strip 30 of flexible material is attached to the tank side wall outer surface 15 by adhesive tapes 31 whereby to permit the circuit board 22 and the temperature sensors secured thereto to be removably secured within the channel member 19 by frictional sliding contact of the temperature sensors 23 with the tank side wall. The barrier strip 30 has a flat channel cross-section defining opposed side spacer feet 32 which rests on the outer surface of the tank side wall to prevent foam material from entering the space 33 wherein the circuit board is disposed. Because the barrier strip 30 is constructed of thin flexible material, such as plastics, it can flex under the influence of expanding foam material to apply and maintain sufficient pressure against the circuit board to retain the circuit board at the desired position inside the barrier strip 30 and bias the temperature sensors 23 against the tank outer surface. For such a removable design to be functional, the channel member 19 would extend to an uppermost position of the tank side wall 15 as shown by dotted lines 19" in FIG. 1 and terminate just under the foam cap 18.

As shown in FIG. 4, a further embodiment, the barrier strip 30 need not be located within the elongated channel member 19 and can be exposed to the insulation space 14. Accordingly, when the foam material 13 is expanded within the space 14 pressure is applied against the barrier strip side wall 30' and exerts a biasing force against the temperature sensors 23 to place them in pressure contact against the outer surface 15 of the tank side wall 15'.

Figure 5:
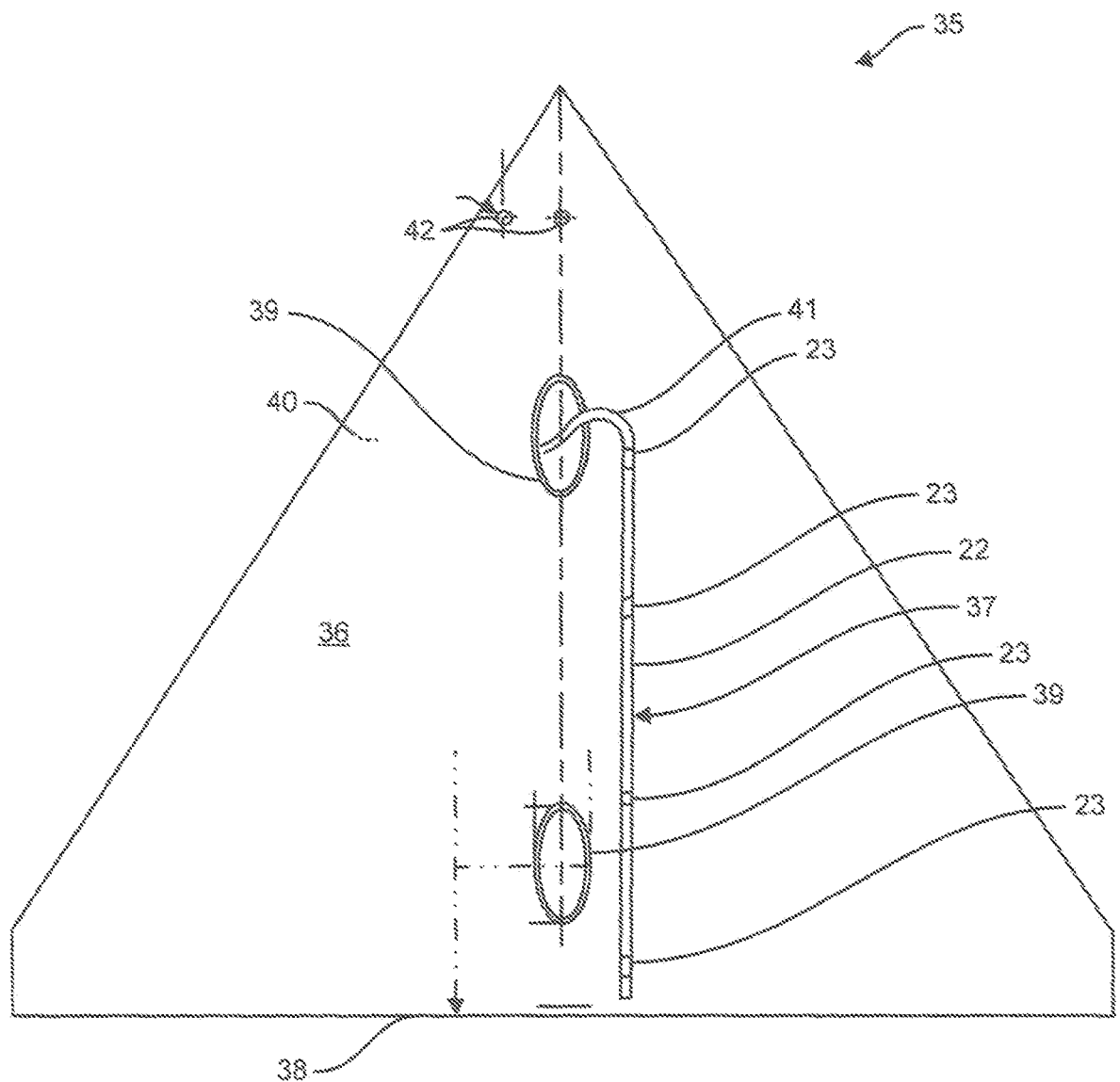
FIG. 5 is a fragmented side view of a flexible material pouch on which temperature sensors are attached and wherein the pouch has sealed openings through which the wires of the temperature sensors are made available for connection to a controller.
Figure 6:
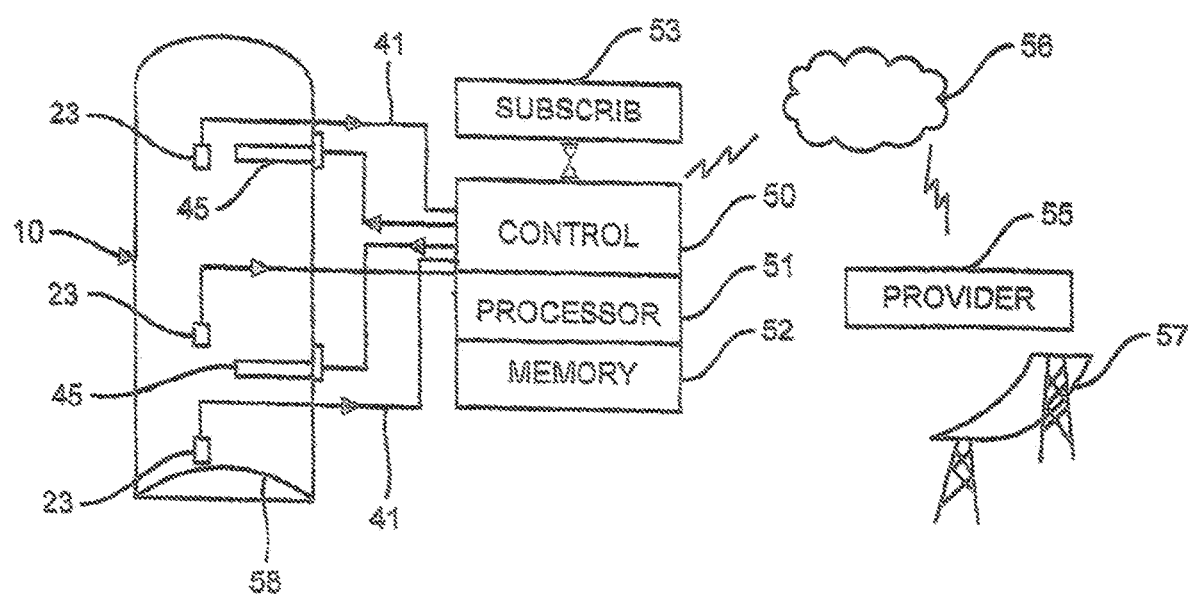
FIG. 6 is a simplified block diagram illustrating a controller system connected to the temperature sensors for monitoring the internal water temperature of the tank and controlling the operation of electric heating elements within the tank to control the internal water temperature to ensure sufficient hot water supply and prevent bacteria proliferation at the bottom end of the tank.

With reference now to FIG. 5 there is shown another embodiment of securing the temperature sensors 23 against the tank outer surface 15. As herein illustrated, the temperature sensors 23 are secured to an expandable foam pouch 35 constructed of flexible plastic film material and dimensioned for insertion into the insulation space 14 between the outer surface 15 of the tank side wall 15' and the inner surface 16' of the outer casing 16. As herein shown, temperature sensors 23 are mounted on an elongated flexible support strip 37 which is attached to the inner flexible wall 36 of the pouch 35 along a straight vertical position. The support 37 may be glued or taped onto the pouch inner surface 36. The temperature sensors 23 are secured in a spaced-apart predetermined position to sense the temperature of the tank outer surface at specific locations to generate temperature signals at such locations. As herein shown, sealed access openings 39 are formed in the expandable foam pouch 35 between the inner flexible sheet 36 an outer flexible sheet 40 thereof. These openings are precisely located on the pouch to line-up with the resistive heating element connectors of the tank, herein two such resistive heating elements 45 as shown in FIG. 6. The signal carrying wires 41 connected to the temperature sensors are positioned in one of these access openings for connection to a controller as further described herein below.

In order to secure the temperature sensors 23 against the thank side wall 15', the foam pouch is inserted into the insulation space 14 with the lower edge 38 of the foam pouch disposed toward the bottom of the insulation space 14 and surrounding the tank. The pouch is further provided with holes 42 to permit insertion of an expandable foaming liquid, herein urethane which when expanding into foam causes the pouch to expand and deploy into the insulation space 14 causing the support strip 37 to position itself against the tank wall with the temperature sensors 23 biased against the outer surface 15 of the tank side wall 15' substantially at the predetermined locations. One of the openings 42 is provided to cause excess expanding foam to exit the pouch after the entire space 14 as been filled with the expanded foam pouch.

With reference now to FIG. 6, the conductors or wires 41 of the temperature sensors 23 of tall of the embodiments described herein, feed continuous actual temperature signals to a processor 51 of a controller computer 50 which has a memory 52 which is programmed to store data and transmit data to various control devices, such as a subscriber control device 53 to permit the subscriber to input commands to the computer 50 to effect certain stored functions such as the control of the resistive heating elements 45 to control the water temperature in the tank 10. The controller is programmed to monitor water temperature throughout the tank and to maintain a desirable programmed temperature.

As further illustrated in FIG. 6, the controller is made accessible to a remote energy provider 55 through a communication link, such as an internet link 56, to have access to the data relating to the temperature of the water within the tank 10 of the electric water heater of the subscriber to permit the energy provider 55 to control the operation of the resistive heating elements 45 to maintain desired temperature of the water within the tank 10. For example, and has described in co-pending patent applications of the Applicant, it is important to maintain a water temperature at the bottom of the tank, near the dome-shaped bottom wall 58 of the tank, in the range of about 140 degrees Fahrenheit in order to prevent bacteria proliferation. In an event where there is a power failure on the grid 57 for a long period of time, the subscribers need to have their water heaters controlled by the provider not to overload the grid when power restored. The controller 50 permits the provider to have access to water temperature at different levels inside the tank 10 and to operate individual ones of the resistive heating elements to start heating water more slowly to control the overall demand from the grid.

The present invention thus provides a method for securing at least two temperature sensors 23 against an outer surface 15 of a tank side wall 15' of an electric water theater. The method can be summarized by the steps of providing an elongated circuit board 22 on which is mounted at least two sensors 23 at predetermined spaced intervals to sense the temperature of the outer surface 15 of the tank side wall 15' at predetermined spaced intervals. The sensed temperature signals have a correlation to the actual temperature of water in the tank 10 at the spaced intervals. The least two sensors 23 are retained against the outer surface of the side wall of the tank along a longitudinal axis of tank, and the temperature sensors 23 are pressure biased against the outer surface of the tank by means of an expandable foam acting there against.

The method further provides the steps of attaching an elongated u-shaped channel member 19 against the outer surface 15 of the side wall 15' of the tank 10 along the longitudinal axis with an elongated opening of the channel facing the outer surface of the tank. The elongated circuit board 22 is positioned inside the channel member 19 from a top end of said channel member with the temperature sensors facing the outer surface of said tank. A foam forming liquid is injected between the circuit board 22 and an inner surface 19' of said u-shaped channel member 19 wherein upon expansion of the foam the at least two sensors 23 are pressure biased against the outer surface 15 of the side wall 15' of the tank 10. A barrier strip 30 may be mounted between a rear surface of the circuit board 22 before injecting the foam forming liquid to provide frictional sliding contact of the circuit board therewith to permit removal and replacement of the circuit board if there is a defect in the wiring of the temperature sensors.

In another embodiment the method provides for the attachment of an elongated support 37 to an inner flexible sheet 36 of an expandable foam pouch 35 of flexible material. The expandable foam pouch 35 is disposed in the surrounding insulating space 14 formed between said outer surface 25 of said tank and an outer casing 16 of the water heater and which is secured in a spaced-apart manner about the tank 10. A foam forming liquid is injected into the expandable foam pouch 35 to cause the pouch to expand and deploy into the insulation space 14 to cause the at least two temperature sensors 23 to be pressure biased against the outer surface 15 of the side wall 15' of the tank along a substantially longitudinal axis.

It is within the ambit of the present invention to cover any obvious modifications of the examples of the embodiment described herein provided such modifications fall within the scope of the appended claims.

The invention claimed is:

1. A method for securing at least two temperature sensors against an outer surface of a tank of an electric water theater, said method comprising the steps of:
   i) providing an elongated circuit board on which is mounted said at least two temperature sensors at predetermined spaced intervals to sense the temperature of said outer surface of said tank at said predetermined spaced intervals, said sensed temperature having a correlation to the actual temperature of water in said tank at said predetermined spaced intervals,
   ii) retaining said at least two sensors against said outer surface of said tank along a longitudinal axis of said tank,
   iii) pressure biasing said at least two sensors against said outer surface of said tank by means of an expandable foam acting there against, and wherein there is further provided the steps of attaching an elongated u-shaped channel member against said outer surface of said tank along said longitudinal axis with an elongated opening of said channel facing said outer surface of said tank, positioning said elongated circuit board in said channel member from a top end of said channel member with said temperature sensors facing said outer surface of said tank, and injecting a foam forming liquid between said circuit board and an inner surface of said u-shaped channel member wherein upon expansion of said foam said at least two sensors are pressure biased against said outer surface of said tank.

2. The method as claimed in claim 1 wherein said step of attaching said elongated u-shaped channel member is effected by one of clamping said u-shaped channel member against said outer surface of said tank and attaching said u-shaped channel member by adhesive tapes, and wherein there is further provided the step of positioning a barrier strip between a rear surface of said circuit board before said step of injecting said foam forming liquid, said barrier strip providing frictional sliding contact with said circuit board to permit removal and replacement of said circuit board.

3. The method as claimed in claim 1 wherein there are at least three of said sensors to provide temperature value signals representative of water temperature from a bottom end of said tank to a top end position where hot water is drawn out of said tank, conductors secured to said temperature sensors and to a controller having a processor equipped with a memory in which is stored functions for execution by a computer of said controller, said sensors generating continuous temperature value signals to said controller, said controller communicating with a utility provider capable of instructing said controller to effect selected functions stored in said memory and capable of controlling power supplied to resistive heating elements of said electric water heater, said functions including without limitations one of or a combination of (a) shedding surplus power from a power grid of said utility, (b) controlling power consumption of said electric water heater, (c) operating a switch mounted with said water heater to cut power supplied to said electric water heater resistive heating elements and to return power thereto, and (d) maintaining a desired temperature at said bottom end of said tank to prevent harmful bacteria proliferation.

4. A method for securing at least two temperature sensors against an outer surface of a tank of an electric water theater, said method comprising the steps of:
   i) providing an elongated circuit board on which is mounted said at least two temperature sensors at predetermined spaced intervals to sense the temperature of said outer surface of said tank at said predetermined spaced intervals, said sensed temperature having a correlation to the actual temperature of water in said tank at said predetermined spaced intervals,
   ii) retaining said at least two sensors against said outer surface of said tank along a longitudinal axis of said tank,
   iii) pressure biasing said at least two sensors against said outer surface of aid tank by means of an expandable foam acting there against, and wherein after step (i) there is provided the steps of
   iv) attaching said elongated circuit board to an inner flexible sheet of an expandable foam pouch of flexible material, v) inserting said expandable foam pouch in a surrounding insulating space formed between said outer surface of said tank and an outer casing of said water heater secured in a spaced-apart manner about said tank, and
iv) injecting a foam forming liquid into said expandable foam pouch to cause said pouch to expand and deploy into said insulation space to cause said at least two sensors to be pressure biased against said outer surface of said tank along said longitudinal axis.

\* \* \* \* \*